United States Patent [19]

Decker

[11] 3,967,130
[45] June 29, 1976

[54] FILM CHANGING EQUIPMENT FOR RAPIDLY CHANGING FILMS CONTAINED IN FLEXIBLE SHEATHS IN RADIOLOGICAL X-RAY EQUIPMENT

[76] Inventor: Kurt Decker, 17, Pohlmannstrasse, 8 Munich 42, Germany

[22] Filed: Nov. 18, 1974

[21] Appl. No.: 525,044

[30] Foreign Application Priority Data
Dec. 6, 1973 Germany............... 2360898

[52] U.S. Cl. ............................. 250/468; 250/521
[51] Int. Cl.² ........................................ G03B 41/16
[58] Field of Search .......... 250/468, 469, 470, 471, 250/521

[56] References Cited
UNITED STATES PATENTS
| | | | |
|---|---|---|---|
| 3,553,453 | 1/1971 | Hogan | 250/468 |
| 3,567,931 | 3/1971 | Eelbema | 250/469 |
| 3,775,613 | 11/1973 | Hommerin | 250/468 |

*Primary Examiner*—Craig E. Church
*Attorney, Agent, or Firm*—John C. Smith, Jr.

[57] ABSTRACT

Film changing equipment for rapidly changing films contained in flexible sheaths in radiological X-ray equipment, in which the sheaths containing the films are conveyed by endless conveyor belts which are transparent to X-rays from a magazine into the correct position for the X-ray exposure and then transferred into a delivery box under the control of switch means. The switch means cause the conveyor belts either to pick up the next available sheath in the magazine or to leave it in the magazine. At least one pair of cooperating endless belts convey the next available sheath presented to them by feed means in the magazine into exposure position by tightly enclosing and gripping each sheath between adjacent faces of codirectionally and synchronously travelling portions of said endless belts.

8 Claims, 5 Drawing Figures

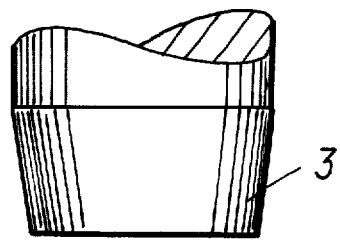
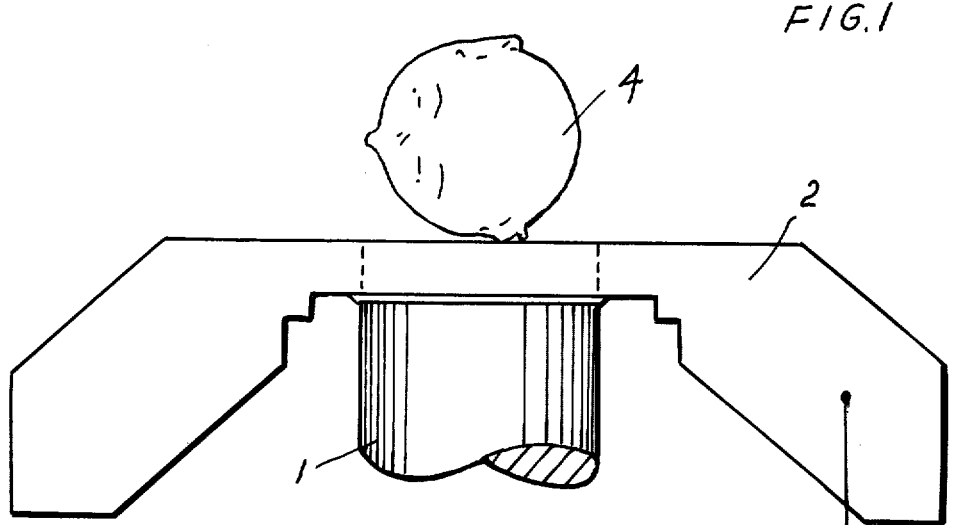
FIG.1
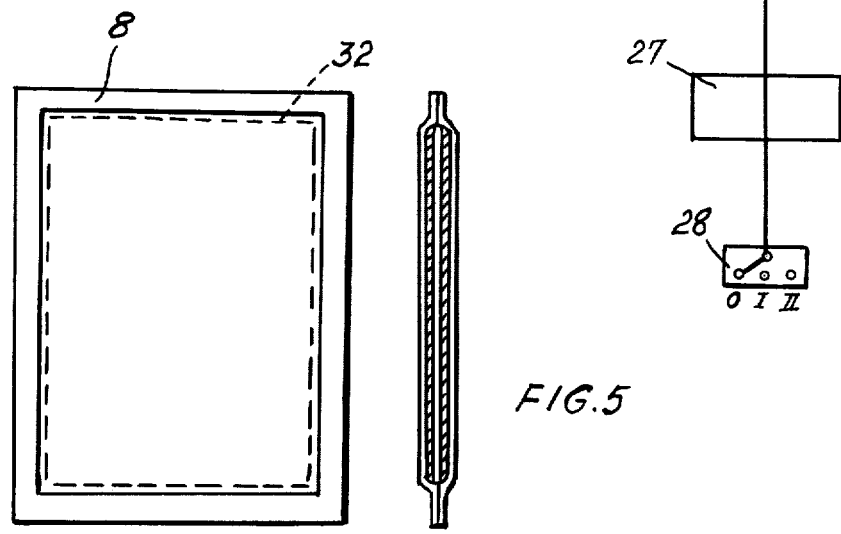
FIG.5

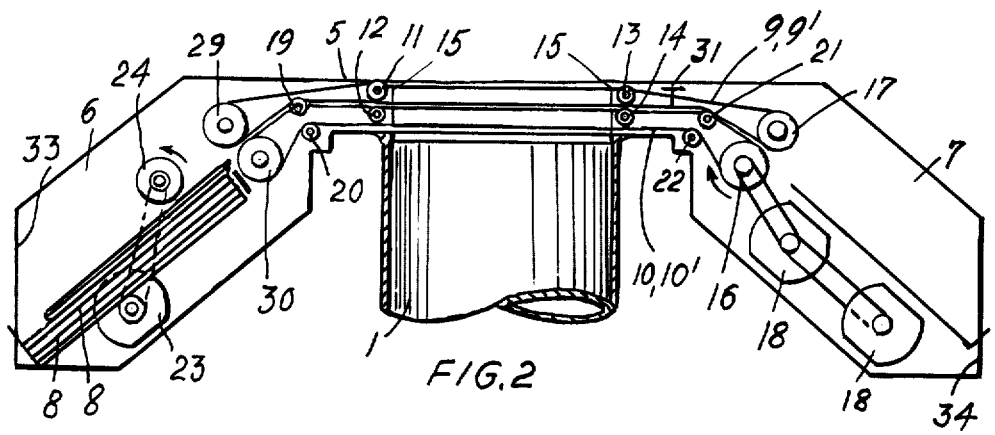
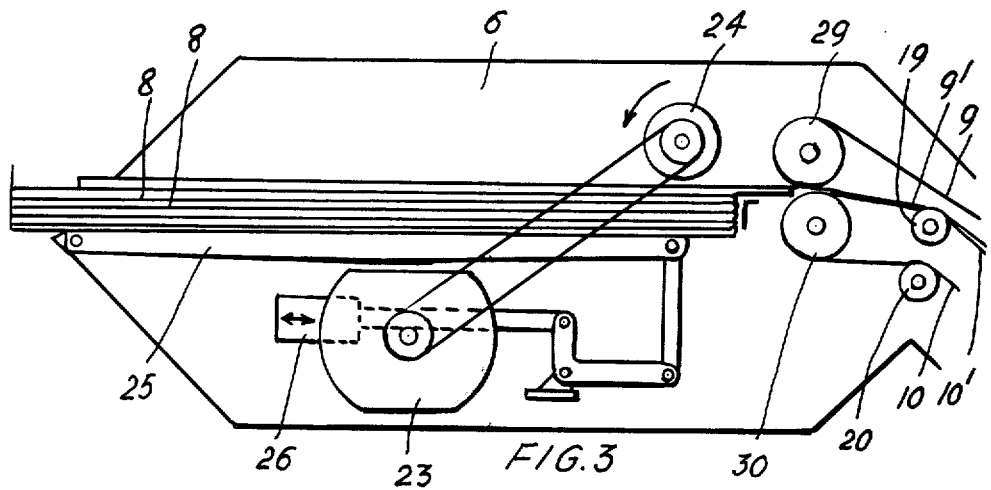
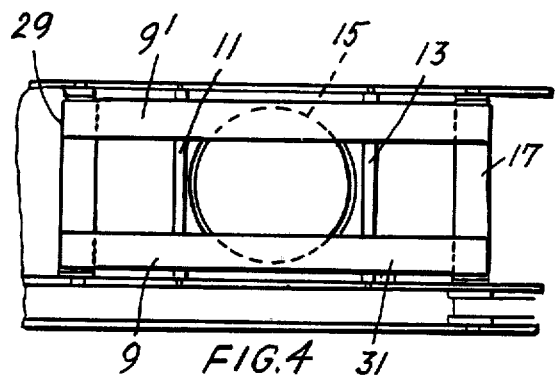

FILM CHANGING EQUIPMENT FOR RAPIDLY CHANGING FILMS CONTAINED IN FLEXIBLE SHEATHS IN RADIOLOGICAL X-RAY EQUIPMENT

BACKGROUND OF THE INVENTION

This invention relates generally to film changing equipment for rapidly changing cut films contained in sheaths in X-ray apparatus.

More particularly the invention relates to film changing equipment for rapidly changing films contained in flexible sheaths in radiological X-ray equipment, in which the sheaths containing the films are conveyed by endless conveyor belts which are transparent to X-rays from a magazine into the correct position for the X-ray exposure and then transferred into a delivery box under the control of switch means which cause the conveyor belts either to pick up the next available sheath in the magazine or to leave it in the magazine.

Film changing equipment of the contemplated kind for consecutively exposing cut films contained in sheaths have the advantage over equipment in which unpacked cut film is used, that the film can be loaded, exposed and the sheaths containing the exposed films removed without the necessity of the normal interior lighting being switched off. Even the film changer itself need not be light-proof. Naturally this presupposes that the film sheaths consist of a material that will transmit only the X-rays.

In film changing equipment of this kind (described for instance in German published Patent Specification No. 1,931,919) each sheath containing one film carries entraining elements for engagement by a cooperating entraining element on the film feeding mechanism.

However, in practice the abrupt engagement of the entraining element on the film sheaths by an entraining element on the feed mechanism is found to subject the conveyor belts to such high forces of acceleration that the belts tear and become useless after very short periods of service whenever the film change is effected as quickly as is desirable. This known film changing device is therefore in practice suitable only for slow work requiring no rapid film change.

SUMMARY OF THE INVENTION

It is therefore an object of the present invention to provide film changing equipment which avoids the shortcomings of film sheaths having entraining elements and which at the same time permits the film change to be effected rapidly.

According to the present invention this is achieved by the provision of at least one pair of cooperating endless belts which convey the next avaible sheath presented to them by feed means in the magazine into exposure position by tightly enclosing and gripping each sheath between adjacent faces of codirectionally and synchronously travelling portions of said endless belts.

The proposal to entrain the film sheaths by tightly gripping them between the belts of the feed means enables the speed of film change to be high whilst at the same time subjecting both the conveying belts and the film sheaths to little wear.

An arrangement which enables films to be rapidly changed, and in which the film material is gripped between cooperating faces of two conveying belts has as such already been proposed (German published Patent Specification No. 1,140,064). However, the film material which is the subject of this proposal is a cut unpacked film, so the arrangement has the previously criticised drawback of permitting the equipment to be loaded only in a darkened room and of requiring the film changer itself to be lightproof. Moreover, the method of operating this prior art film changer is awkward and would not permit continuous work involving the taking of a large number of radiographs to be carried out, bearing in mind that before starting the equipment the unpacked cut films (of which only a limited number can be inserted) must be wound consecutively into a roll between two interleaving tapes of finite length and loaded into a magazine. The films between the tapes must then be consecutively pushed between the belts of a conveyor which are in turn wound on a drum type magazine. If radiographs are to be made in rapid succession it is then possible to convey the cut films between the belts quickly into position for the exposure to be made and just as quickly to remove them when the exposure has been made, the exposed films being discharged into a magazine for exposed film in which they collect in a random heap. Apart from the above-described inconvenient preparations that are needed before the equipment can be started, the finite length of the conveyor belts permits only a limited number of exposures to be consecutively made. Furthermore, the entire material on the magazine drum including the belt, drum and drive means must be accelerated and retarded for each conveying step so that a really fast film change and an really rapid sequence of exposures cannot in practice be obtained. Moreover, the optional production of single radiographs or of a set of sequential radiographs with the possible interpolation of direct visual inspections is out of the question.

The proposed film changing equipment is therefore novel and at the same time offers advantages which had never before been contemplated by persons skilled in the art. In a further development of the present invention it is preferred to provide two juxtaposed pairs of belts, each pair gripping only one margin of the sheath containing a film. In case of need a third pair of belts may be provided intermediately between the first two pairs to guide and locate the sheath in the centre.

Conveniently the transportation of the sheaths may be effected under the control of a controller which is associated with the film changing equipment proper, and which in accordance with the position of a manual multiposition selector switch controls the film changing equipment as may be desired.

BRIEF DESCRIPTION OF THE DRAWINGS

In order that the nature of the invention may be better understood these and other features and advantges of the invention will be more particularly and purely illustratively described with reference to an embodiment shown in the accompanying drawings, in which:

FIG. 1 illustrates the general constructional layout of film changing equipment according to the invention in conjunction with an X-ray machine which is only schematically indicated;

FIG. 2 is a section of the film changing equipment;

FIG. 3 is an enlarged view of the magazine portion of the equipment;

FIG. 4 is an section, likewise on a larger scale, of the central part of the equipment, and FIG. 5 is an individual sheath in plan and in cross section.

DESCRIPTION OF THE PREFERRED EMBODIMENTS

Referring first to FIG. 1 there is provided an X-ray machine of a generally conventional type in which the otherwise usual film holder is replaced by film changing equipment 2 according to the invention. The latter is merely indicated in outline and there is also schematically shown part of an X-ray tube at 3, the head 4 of a patient who is to be examined, and an image intensifier. 1. An electronic controller 27 of which no details are shown contains switch means which permit the desired operating programme to be selected (single or series exposures) and the exposure times to be preset.

Moreover, a master switch 28 is provided which permits the several operations of the film changing equipment (start, take, stop) to be initiated.

The essential details of the film changing equipment 2 are shown in FIG. 2. The film changing equipment consists of a casing which in conventional manner is shielded and X-ray proof, comprising a flat exposure section 5 in the centre to each side of which there is attached (roughly at an angle of 45°) a wing with open ends 33 and 34 through which the wing interiors are readily accessible. One wing houses a magazine 6 for cut films in sheaths 8 and the other a delivery box 7 for the reception of the exposed films in their sheaths. In the illustrated embodiment these two wings are shown off-angled downwards. However, if desired, they might both be angled upwards or one (for instance that with the magazine 6) might be angled upwards and the other downwards. Each film sheath 8 (FIG. 5) consists of a length of flat plastics tubing which, after insertion of a film 32 and of the necessary customary intensifying foil, usually in the form of a piece of cardboard bearing a deposit of lead, is closed at each end without the addition of any further part simply by hot sealing. Instead of inserting intensifying foils in the sheats it would also be possible to make use of an aluminum foil with a vapour deposited layer of lead on its back and of a gauge and hardness so chosen that it will pass over deflecting rollers in the equipment without being permanently deformed though sufficiently stiff to keep the film flat in the central section of the equipment during exposure. In the illustrated arrangement the means for feeding the sheathed cut film consist of two pairs of endless travelling conveyor belts 9, 9' and 10, 10' which convey the film sheaths 8 between their adjacent sides, and which run over coupled driving rollers 16 and 17 which (for reasons of space) are driven by two clutch motors 18 working in parallel. As a further safeguard for ensuring reliability a third pair of belts not shown in the drawings may be arranged to travel intermediately between the two above-described pairs of belts. The feed rollers 16 and 17 which are located in the film sheath delivery box 7 are crowned aluminum rollers in milled rubber jackets. For guiding the conveyor belts the magazine 6 contains a pair of return rollers 29, 30 which are parallel to the driving rollers 16, 17 in the delivery box 7. The peripheries of the rollers of each pair are substantially contiguous and guide the feeding portions (9, 10; 9', 10') of the two belts into contact at the magazine end and separate them again at the delivery end in the delivery box for return to the magazine. Moreover, directly preceding and following the exposure section 15 (FIG. 3) additional pairs of parallel idling guide rollers 11, 12 and 13, 14 are provided which ensure that the conveying portions will travel across the exposure section 15 in close contiguity; at the same time the four rollers 11, 12, 13 and 14 also guide the return portions of the pairs of endless belts. Finally pairs of deflecting rollers 19, 20, 21, 22 are provided for deflecting the feed belts from the centre section into each of the wings.

The feeder (FIG. 3) for single films in their sheaths 8 comprises a pick-up roller 24 which is driven by another motor 23 and against which the uppermost of a stack of film-containing sheaths 8 on a tiltable magazine table 25 is briefly pressed in such a manner that the uppermost sheath is first advanced into a preparatory position before being gripped between the pairs of endless belts 9, 10, 9', 10' in the nip of the two rollers 29, 30. The brief upward deflection of the table 25 is effected by a magnet 26 operated by the controller 27 associated with the film changing equipment.

Finally, the film changing equipment is provided with switch means 31 (FIG. 2) in the exposure section which are operated by the conveyed film sheath 8, and which by transmitting a signal to the controller 27 cause the latter to stop the belts by declutching the driving rollers from the motors as well as by operating brakes, not shown, which ensure that the sheath containing the film will be stopped in the correct position 15 for the exposure.

The described film changing equipment functions as follows:

The magazine 6 is first loaded by the introduction thereinto of a stack of films in their sheaths, possibly with the interposition of metal separating foils. The exposure time is then preset on the controller 27. It is also decided whether single or serial operation is required and in the latter case the intervals between consecutive radiographs are also selected. The master switch 28 is then set to stage I. This causes the controller 27 a. to switch on the X-ray equipment and to heat up the tube, and b. to start the driving motors 18 (for the conveyor belts 9, 10, 9', 10') and 23 (for picking up the film sheaths in the magazine).

Shortly afterwards the controller 27 engages the clutch of motor 23 for activating the pick-up roller 24. At the same time the magnet 26 is energized and tilts the table 25 carrying the stack of films so that the uppermost sheath 8 containing a film is pressed into contact with the pick-up roller 24 driven by motor 23. This sheath 8 is therefore advanced into close proximity with the conveyor belts. When the master switch 28 is moved into stage I the controller also engages the clutches for driving the conveyor belts 9, 10, 9', 10' and these belts will therefore also begin to revolve. Shortly afterwards a further signal is generated by the controller for energizing the magnet 26 a second time, resulting in the table 25 being lifted again and the advanced sheath 8 being fed into position 15 for the exposure.

If the master switch 28 is now moved over to stage II the film in position 15 will be exposed for the time preset on the controller.

After the exposure the controller releases the brakes of the conveyor belts and re-engages the clutches of the two driving motors 18, causing the conveyor belts to start moving again. The sheath containing the exposed film will therefore be conveyed into the delivery box 7 and there ejected. When this has been done the clutches driving the conveyor belts are again disengaged by the controller 27 so that the conveyor belts stop, whereas the motors continue to run. The latter will not stop until the master switch is returned to position 0. In this position the X-ray equipment is also switched off. In order to take another single radiograph the master switch 28 is again set to stage I and the described sequence of events repeats itself. On the other hand, if a set of radiographs is to be sequentially taken, appropriate controls on the controller must first be switched into the appropriate positions. The first radiograph of the series will then be produced in exactly the same way as a single radiograph. However, after the first exposure has been made the master switch 28 remains in stage II.

The sheath containing the exposed film will therefore be entrained by the travelling conveyor belts and deposited in the delivery box 7.

At the same time as the conveyor belts are reactivated the magnet 26 is also energized briefly to permit the next unexposed film in its sheath to be transferred from its preparatory position into position for the next exposure.

This process repeats itself until the master switch 28 is returned to stage 0. This results in the same actions taking place for stopping the equipment as after a single exposure.

When the film changing equipment is not in use the open exposure position is available for direct visual inspection with the aid of the image intensifier 1. In other words, the equipment is a direct viewing film changer. In view of its compactness and shape film changing equipment according to the invention is suitable for association as an accessory with any type of X-ray machine, in which case it swings together with the X-ray tube. It is not in the way during diagnostic treatment nor does it require operations to be performed on the film itself when single radiographs are to be taken with intervening direct inspections, or if a set of radiographs is to be sequentially taken.

As soon as the exposure has been made the exposed film inside the lighttight sheath can be re-opened by hand at any time and sent to the laboratory for instance through a pneumatic dispatch tube or in some other way. Moreover, the loading of fresh film stacks into the magazine can take place in the fully lit theatre and in view of the radiologist and his assistants, permitting them to keep entire control of the operation.

The invention may be embodied in other specific forms without departing from the spirit or essential characteristics thereof. The embodiments are therefore to be considered in all respects as illustrative and not restrictive.

What is claimed is:

1. A device for rapidly changing a plurality of film sheaths in radiological x-ray equipment, each sheath comprising a length of flat plastic tubing closed at opposite ends and containing a film and a reinforcing foil sufficiently stiff to maintain the film flat during exposure, said device comprising
    a. an exposure section and magazine and delivery sections in communication with said exposure section at opposite sides respectively of said exposure section;
    b. conveyor means including at least two rollers adjacent each of said opposite sides of said exposure section, the peripheral surfaces of said rollers on each of said sides being adjacent each other, at least one pair of endless conveyor belts transparent to x-rays extending across said exposure section between a pair of said rollers at opposite sides respectively of said exposure section such that a run of one of said belts is in confronting relationship with a run of the other of said belts for retaining and transporting said film sheaths in succession therebetween, and drive means for said conveyor means;
    c. means in said magazine section for supporting a stack of said film sheaths and means for feeding said film sheaths in succession to the nip between said rollers at one side of said exposure section said means for supporting a stack of said film sheaths in said magazine section comprising a pivotally mounted table for supporting said stack of film sheaths, a pickup roller positioned for contact with the top surface of the top film sheath of said stack, means for pivoting said table toward said pickup roller to press said top film sheath against the surface of said pickup roller and means to drive said pickup roller to feed successive top film sheaths into the nip between said rollers at one side of said exposure section to transport said film sheaths to said exposure section; and
    d. means in said delivery section for receiving said film sections in succession from said conveyor means and storing film sheaths in a stack.

2. A device according to claim 1, wherein said conveyor means comprises two pairs of said endless conveyor belts spaced from each other for retaining said film sheaths adjacent the opposite sides thereof.

3. A device according to claim 1, further comprising control means including a manually operated switch for controlling said device to cause a single film sheath to be moved from said magazine section to said exposure section, to cause an x-ray picture to be taken, and to cause film sheaths to be conveyed sequentially from said magazine section to said exposure section to said delivery section with x-ray pictures being taken sequentially at said exposure section.

4. A device according to claim 1, wherein said conveyor means further comprises guide rollers positioned along said runs of said conveyor belts to press said runs of said conveyor belts together for securing said film sheaths.

5. A device according to claim 1, wherein said rollers adjacent said delivery section are drive rollers, said drive means being located in said delivery section and connected to said drive rollers.

6. A device according to claim 1, further comprising control means for sequentially pivoting said table toward said pickup roller before each top film sheath is fed by said pickup roller to said nip between said rollers.

7. A device according to claim 1, wherein said means for supporting said stack of said film sheaths is arranged to support said film sheaths at about a forty-five degree angle with respect to the plane of said runs of said belts.

8. A device according to claim 1 wherein the respective sides of said magazine and delivery sections opposite said exposure section are open whereby said film sheaths may be inserted in said support means and removed from said receiving and storing means respectively.

* * * * *